United States Patent
Daudel et al.

(10) Patent No.: US 6,209,324 B1
(45) Date of Patent: Apr. 3, 2001

(54) EXHAUST TURBOCHARGER

(75) Inventors: Helmut Daudel, Schorndorf; Helmut Finger, Leinfelden-Echterdingen; Siegfried Sumser, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/303,435

(22) Filed: May 3, 1999

(30) Foreign Application Priority Data

May 2, 1998 (DE) .............................................. 198 19 699

(51) Int. Cl.[7] ...................................................... F02B 33/44
(52) U.S. Cl. .............................. 60/605.2; 60/602; 60/611; 123/570; 123/322; 415/157; 415/158; 415/160; 415/164
(58) Field of Search ..................... 60/605.2, 609, 60/611, 607, 602, 600; 415/160, 157, 158, 151, 48, 164; 123/322, 570

(56) References Cited

U.S. PATENT DOCUMENTS

| | | | |
|---|---|---|---|
| 4,499,732 | * 2/1985 | Szczupak et al. | 415/158 |
| 4,653,275 | * 3/1987 | Sumser et al. | 60/602 |
| 4,689,960 | * 9/1987 | Schroder et al. | 60/607 |
| 4,776,757 | * 10/1988 | Sedille et al. | 415/164 |
| 4,886,416 | * 12/1989 | Wuderlich | 415/158 |
| 5,025,629 | * 6/1991 | Woollenweber | 415/160 |
| 5,064,423 | * 11/1991 | Lorenz et al. | 60/611 |
| 5,267,829 | * 12/1993 | Schmidt et al. | 415/48 |
| 5,335,500 | * 8/1994 | Wunderlich et al. | 60/609 |
| 5,540,201 | * 7/1996 | Feucht et al. | 123/322 |
| 5,615,653 | * 4/1997 | Faletti et al. | 123/322 |
| 5,647,318 | * 7/1997 | Feucht et al. | 123/322 |
| 5,771,868 | * 6/1998 | Khair | 123/570 |
| 5,868,552 | * 2/1999 | McKean et al. | 415/158 |
| 5,937,651 | * 8/1999 | Braun et al. | 60/605.2 |

FOREIGN PATENT DOCUMENTS

| | | |
|---|---|---|
| 3322436A1 | 1/1985 | (DE) . |
| 4231218C1 | 9/1993 | (DE) . |
| 4303521C1 | 1/1994 | (DE) . |
| 4312078A1 | 10/1994 | (DE) . |
| 4330487C1 | 1/1995 | (DE) . |
| 4416572C1 | 4/1995 | (DE) . |

\* cited by examiner

Primary Examiner—Thomas Denion
Assistant Examiner—Thai-Ba Trieu
(74) Attorney, Agent, or Firm—Evenson, McKeown, Edwards & Lenahan, P.L.L.C.

(57) ABSTRACT

An exhaust turbocharger for an internal combustion engine has a main compressor for compressing the fresh air supplied to the engine, an additional compressor for compressing combustion gases to be recycled to the engine, and a turbine that can be driven by the exhaust gases from the engine and which serves to drive the main compressor and the additional compressor. The turbine has an adjustable geometry which facilitates optimization of engine operation regarding pollutant emissions, fuel consumption, and performance.

26 Claims, 1 Drawing Sheet

EXHAUST TURBOCHARGER

BACKGROUND AND SUMMARY OF THE INVENTION

This application claims the priority of German application 198 19 699.7-13, filed in Germany on May 2, 1998, the disclosure of which is expressly incorporated by reference herein.

The invention relates to an exhaust turbocharger for an internal combustion engine and an engine equipped therewith, said exhaust turbocharger being provided with a main compressor for compressing fresh air to be supplied to the engine, an additional compressor for compressing the combustion exhaust gases recycled to engine, a turbine that can be driven by the exhaust gases from the engine and which serves to drive the main compressor and the additional compressor, an exhaust return line by which the exhaust gases to be returned to the engine are supplied to the additional compressor, and a boost air line by which the air compressed in the main compressor is supplied to the engine.

Exhaust turbochargers are regularly used for increasing the performance of vehicle engines, especially in motor vehicles, with reduced fuel consumption being possible at the same time. An exhaust turbocharger of the type recited at the outset is known from German Patent Document DE 43 12 078 A1. In order for exhaust recycling, especially for reduction of NOx emissions, to be feasible in an engine with an exhaust turbocharger, the recycled exhaust gases must have at least the same pressure as the boost air supplied to the engine for combustion and to be mixed with the recycled exhaust gases. Since an exhaust return line removes a portion of the exhaust gases to be recycled for combustion before they enter the turbine of the turbocharger, the required pressure in the recycled exhaust gases in conventional exhaust turbochargers that operate without an additional compressor can be produced by a corresponding buildup of the exhaust gases upstream of the turbine. For this purpose, the turbine guide grid of the exhaust turbocharger turbine is designed to produce appropriate throttling. However, as a result of this throttling, the performance, and especially the efficiency of the turbine is significantly reduced in particular. In distinction to this, the abovementioned known turbocharger for producing the pressure required to recycle the exhaust has an additional compressor that is driven by the turbine together with the main compressor. This feature makes it possible to run the turbine of the exhaust turbocharger with improved efficiency. Then sufficient surplus power is available in order to increase the exhaust to be recycled to the necessary (boost) pressure in the additional compressor.

The quantity of recycled exhaust required for achieving favorable pollutant emission values depends on the individual operating state of the engine (load, rpm). Similarly, the pressure required for boosting the engine is likewise dependent on the operating state of the engine. Deviation from the optimum boost pressure for the individual operating state leads to increased charge changing losses and consequently to power losses and increased fuel consumption by the engine. The known exhaust turbocharger can be designed only for a specific operating point of the engine as regards optimum values both for pollutant emissions and also for engine power and fuel consumption. At all operating points that differ from this, deterioration of at least one of these values can occur.

The present invention is concerned with the problem of designing an exhaust turbocharger of the type recited at the outset so that an internal combustion engine equipped with it is improved as regards pollutant emissions, fuel consumption, and performance.

This problem is solved according to the invention by an exhaust turbocharger of the above described general type, wherein the turbine has a variable geometry and a first control member is located in the exhaust return line to selectively connect the exhaust return line to the intake side of the additional compressor or to the boost air line.

The invention is based on the general idea of designing the turbine used for driving the main compressor and the additional compressor as variable turbines with variable geometry.

Preferably adjustable guide grids, rotatable guide blades, axially displaceable guide grid rings or flaps in the turbine area or the like can be used to vary the throughput geometry of the turbine. A turbine of this kind is basically known for example from German Patent Documents DE 33 22 436 A1, DE 43 03 521 C1, and DE 43 30 487 C1. The use of a variable turbine of this kind in an exhaust turbocharger that has an additional compressor for exhaust recycling permits the exhaust recycling to be influenced by changing the accumulated pressure in the exhaust gases upstream of the turbine. A change of this kind in the accumulated pressure upstream of the turbine firstly has a indirect influence on the exhaust recycling rate and secondly produces a change in the turbine power and consequently a change in the boost pressure that can be produced in the main compressor and in the additional compressor, and thus also exerts an indirect influence on the exhaust recycling rate. Because of these effects that are linked to one another, an improvement in the values for pollutant emissions, engine power, and fuel consumption can be achieved.

The design of the exhaust turbocharger according to the invention permits optimization of engine operation over the entire range of engine operating states as regards fuel consumption, pollutant emissions, and engine performance.

In one preferred embodiment of the exhaust turbocharger according to the invention, a gas line connection can be provided with which the gases compressed in the additional compressor can be fed into a boost air line through which the air compressed in the main compressor is supplied to the engine.

In an improvement on the exhaust turbocharger, a boost air cooler can be provided in the boost air line. The gas line connection coming from the additional compressor is then connected to the boost air line downstream of this boost air cooler and upstream of the engine. This measure prevents contamination of the boost air cooler by materials transported in the exhaust, soot particles for example.

In certain preferred embodiments of the turbocharger according to the invention, a control member can be located in an exhaust return line through which the exhaust gases recycled to the engine can be supplied to the additional compressor, by which control member the quantity of exhaust flowing into the exhaust return line can be controlled. With this measure, the exhaust recycling rate can be additionally influenced in order better to adapt it to the respective operating conditions of the engine and to shut it off as well if necessary.

In accordance with certain preferred embodiments of the exhaust turbocharger according to the invention, an additional control member can be provided in the exhaust return line by which the exhaust return line can be connected either to the intake side of the additional compressor or to the gas line connection to the boost air line or directly to the boost air line. With the aid of this additional control member, it is possible to cause the exhaust stream to be recycled to bypass the additional compressor. This can be advantageous at certain operating points of the engine or of the turbine in which an accumulated pressure builds up in the exhaust upstream of the turbine, said pressure guaranteeing the optimum exhaust recycling rate for this operating point.

In addition, advantages are gained if the exhaust turbocharger according to the invention is used in an internal combustion engine which, in addition to the exhaust turbocharger according to the invention, has an exhaust recycling device and a control device that permits switching engine operation between driving operation and braking operation. The exhaust turbocharger and a control device are designed so that the control device controls or actuates the exhaust turbocharger to regulate the engine braking power during braking operation. An exhaust turbocharger of this kind designed to reinforce the engine braking is thus referred to as a turbo brake.

With the aid of a control member located in the exhaust return line, by which the amount of exhaust recycled through the exhaust return line can be controlled, i.e., for engine braking operation the recycling of the gases. In this case the compressed air can be completely disconnected from the turbo brake, with the control member closing the exhaust return line. In addition, at certain operating points of the engine or the turbine, the effect of the turbo brake can be improved with the aid of the recycling of the air compressed by the engine if at these operating points the control member is opened, especially as a function of the rpm of the engine and preferably continuously. While in conventional turbo brakes the turbine guide grid must be opened in an upper rpm range of the engine, in order on the one hand to keep the accumulated pressure upstream of the turbine and on the other hand to maintain the boost pressure downstream of the main compressor in a ratio that is suitable for achieving maximum engine braking effect and to avoid damage to the turbine, these effects can also be achieved when using the exhaust turbocharger according to the invention by opening the control member to a greater degree as the rpm increases, especially continuously.

In addition, the performance of the turbo brake can be additionally reinforced particularly in the lower rpm range of the engine by supplying additional mass to the engine through the gas return line while appropriately controlling the control member. By this measure, which can be affected by corresponding control signals from the control device, the compression work of the engine is increased and thus its braking action in this important rpm range. The variation of the recycled gas volume and its engine intake temperature can be controlled regarding maximum braking power by a suitable interaction between the turbine grid adjustment and the control member adjustment. The turbine guide grid is generally adjusted in this case to a very narrow outlet cross section. In addition, an exhaust cooler that may be connected into the exhaust return line can be deactivated in order to increase the temperature of the recycled gases.

Other objects, advantages and novel features of the present invention will become apparent from the following detailed description of the invention when considered in conjunction with the accompanying drawings.

BRIEF DESCRIPTION OF THE DRAWINGS

The single drawing

DETAILED DESCRIPTION OF THE DRAWINGS

Figure 1:
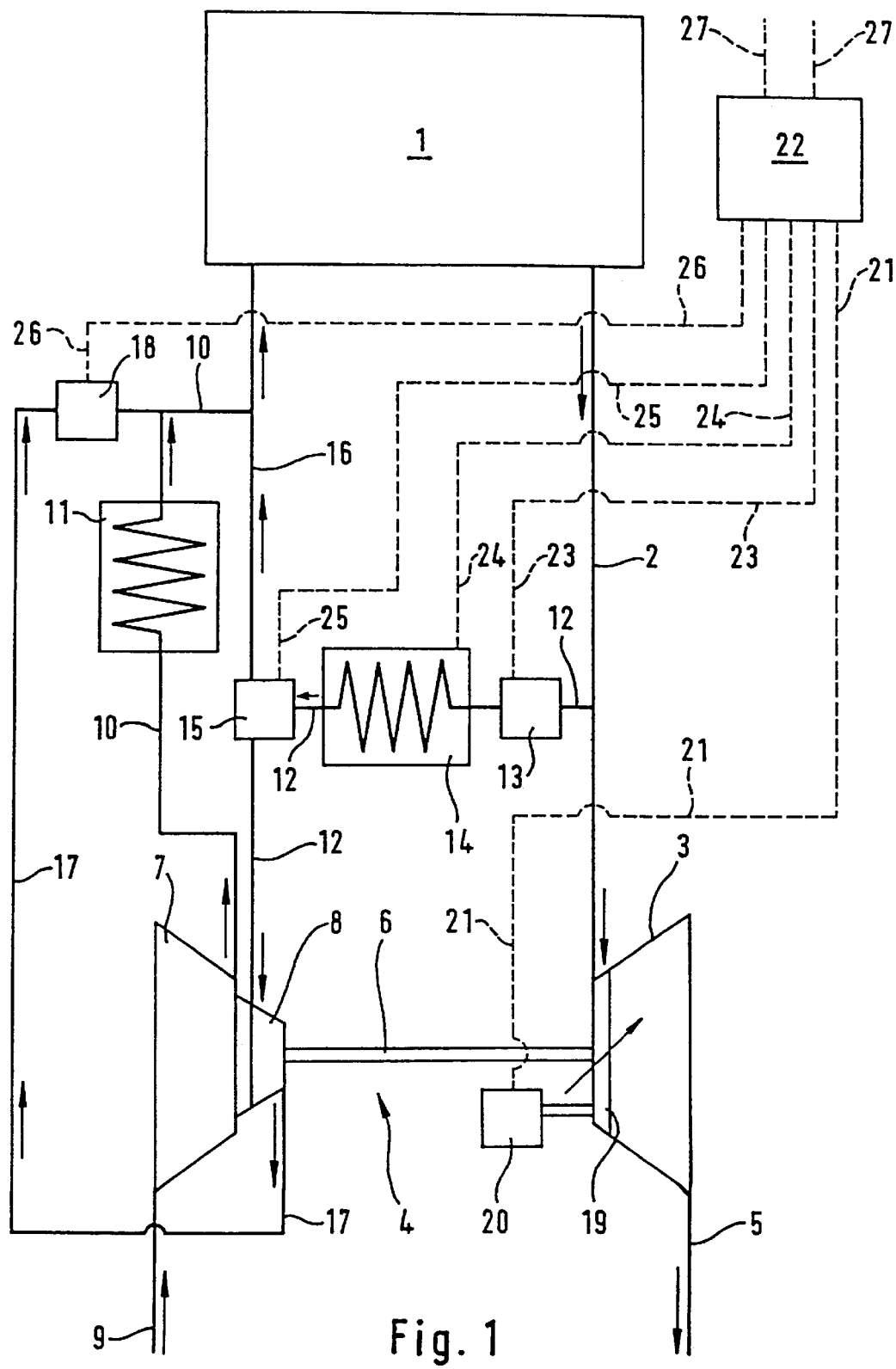
FIG. 1 shows a schematic diagram of an internal combustion engine equipped with the exhaust turbocharger according to the invention.

According to FIG. 1, an internal combustion engine 1 has an exhaust line 2 by which the exhaust gases from engine 1 are supplied following combustion to a turbine 3 of an exhaust turbocharger 4 according to the invention. The exhaust gases from engine 1 serve to drive turbine 3 of the exhaust turbocharger 4. The exhaust gases expanded in turbine 3 are supplied through a line 5 for example to an exhaust scrubbing device, not shown.

Turbine 3 drives a shaft 6 on which a main compressor 7 and an additional compressor 8 are mounted. Main compressor 7 serves to boost fresh air drawn in through a fresh air line 9 to a certain boost pressure. The compressed air (boost air) is supplied through a boost air line 10 to engine 1 for combustion. A boost air cooler 11 is located in the boost air line 10 for cooling the boosted air.

To improve the pollutant levels in the exhaust gases from internal combustion engine 1, a portion of the exhaust gases formed is recycled for combustion once more. For this purpose, an exhaust return line 12 is connected to exhaust line 2, through which line 12 a portion of the exhaust gases suitable for exhaust recycling can be tapped off for combustion. A second control member 13 is located in gas return line 12, with which the quantity of recycled exhaust gases can be adjusted or controlled. Downstream of this control member 13 an exhaust cooler 14 is also located in the exhaust return line 12 with which the exhaust gases to be recycled can be cooled. Downstream of the exhaust cooler 14 a second control member 15 is located in the exhaust return line 12, said member 15 being designed as a switch and supplying the recycled exhaust either through another portion of the exhaust return line 12 to the additional compressor 8 or into a bypass line 16 which preferably terminates downstream of the boost air cooler 11 in the boost air line 10.

The exhaust return line 12, downstream of the first control member 15, guides the gases transported therein to the intake side of additional compressor 8. The exhaust compressed therein leaves the additional compressor 8 through a gas line connection 17 that preferably terminates downstream of the boost air cooler 11 in boost air line 10. A third control member 18 designed as a check valve is located in a portion of the gas line connection 17 remote from additional compressor 8.

Turbine 3 is equipped with an adjustable guide grid 19 whose adjustability is symbolized in FIG. 1 by an arrow. To adjust guide grid 19, an appropriate control drive 20 is provided which is connected through a corresponding control line 21 with an electrical or electronic control device 22. In the same way as the rotatable guide blades of guide grid (19) indicated in FIG. 1, other variable elements can also be used with which the corresponding behavior can be achieved in the turbine.

Control device 22 is also connected through suitable control lines 23, 24, 25, and 26 with the second control member 13, with the exhaust cooler 14, with the first control member 15, and with the third control member 18. In addition, the control device 22 is connected through lines 27 with an engine control, not shown, through which the control device 22 obtains information about the current operating state of engine 1 (engine load and engine rpm for example).

Control device 22 tunes the gas recycling process, controlled in particular in terms of a characteristic map, with the boost air being compressed as a function of the current engine operating state. In this fashion, a tuning that is optimized with regard to favorable values for pollutant emissions, fuel consumption, and engine performance can be obtained for every operating state of engine 1. The control device 22 then influences the abovementioned values essentially by means of the second control member 13 and the control drive 20.

With a suitable design of the exhaust turbocharger 4, the latter can be utilized to reinforce the braking action of engine 1 during its braking operation, in other words it can be used as a turbo brake. The effect of such a turbo brake can be improved by the design of the exhaust turbocharger 4 according to the invention. A turbo brake of this kind is designed for reinforcing the braking effect of the engine in the lower to medium rpm ranges of engine 1, since it is precisely in these rpm ranges that reinforcement of the braking effect of engine 1 is especially desirable. In view of these requirements, in order to prevent damage to turbine 3, the turbine guide grid 19 must be opened in the high rpm ranges of engine 1. The turbo brake can be adapted only relatively coarsely to the rpm of engine 1 by adjusting the turbine guide grid 19 in the above operating states. While in normal turbo brake operation the second control member 13 closes the exhaust return line 12 in order to produce the required pressure buildup upstream of turbine 3, this control member 13 can be opened at high engine rpm values of engine 1. Control member 13 is preferably opened proportionally to the increase in rpm. By opening the control member 13, the compressed air can flow out through the exhaust return line 12, so that the accumulated pressure upstream of turbine 3 may be regulated. Regulation of this kind by control member adjustment can be performed more sensitively than by performing the abovementioned turbine guide grid adjustment, so that the turbo brake can be adjusted more precisely to engine operation in the upper rpm range of engine 1.

In the range of low rpm values in which a maximum braking effect is especially desirable, with the aid of the exhaust turbocharger 4 designed according to the invention, its effect as a turbo brake can be increased. By opening the control member 13, because of the compression in engine 1, more highly compressed air can be supplied to engine 1, so that the compression work of engine 1 is increased and thus the braking power of the engine 1 can be increased. It is obvious that the exhaust cooler 14 is then deactivated by the control device 22 through line 24.

The third control member 18 is preferably designed as a check valve in order to prevent backward flow of the air compressed by main compressor 7 through the additional compressor 8 during braking operation of engine 1.

The second control member 13 is preferably designed as an overpressure regulating valve in order to prevent damage to turbine 3 during braking operation of engine 1, especially at high rpm values, because of an excessive pressure buildup in the air compressed by the braking operation of engine 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An Exhaust turbocharger for an internal combustion engine comprising:
    a main compressor for compressing fresh air to be supplied to the engine,
    an additional compressor for compressing the combustion exhaust gases recycled to engine,
    a turbine that can be driven by the exhaust gases from the engine and which serves to drive the main compressor and the additional compressor,
    an exhaust return line by which the exhaust gases to be returned to the engine are supplied to the additional compressor, and
    a boost air line by which the air compressed in the main compressor is supplied to the engine,
    wherein the turbine has a variable geometry and a first control member is located in the exhaust return line to selectively connect the exhaust return line to the intake side of the additional compressor and to the boost air line.

2. The exhaust turbocharger according to claim 1, wherein the turbine has at least one of an adjustable guide grid, rotatable guide blades, axially displaceable guide grid rings, and flaps in the turbine intake area.

3. The exhaust turbocharger according to claim 1, wherein a gas line connection is provided by which the exhaust gases compressed in the additional compressor can be conducted into the boost air line.

4. The exhaust turbocharger according to claim 2, wherein a gas line connection is provided by which the exhaust gases compressed in the additional compressor can be conducted into the boost air line.

5. The exhaust turbocharger according to claim 3, wherein a boost air cooler is provided in the boost air line, with the gas line connection being connected to the boost air line between the boost air cooler and the engine.

6. The exhaust turbocharger according to claim 1, wherein a second control member is located in the exhaust return line for controlling the quantity of exhaust flowing into the exhaust return line.

7. The exhaust turbocharger according to claim 6, wherein the second control member is designed as an overpressure valve or contains such a valve.

8. The exhaust turbocharger according to claim 6, wherein an exhaust cooler is provided in the exhaust return line.

9. The exhaust turbocharger according to claim 3, wherein a check valve is located in the exhaust line connection, said check valve allowing flow in the direction of the boost air line.

10. The exhaust turbocharger according to claim 1, wherein the main compressor, the additional compressor, and the turbine are mounted on a common shaft.

11. The exhaust turbocharger according to claim 4, wherein a boost air cooler is provided in the boost air line, with the gas line connection being connected to the boost air line between the boost air cooler and the engine.

12. The exhaust turbocharger according to claim 5, wherein a second control member is located in the exhaust return line for controlling the quantity of exhaust flowing into the exhaust return line.

13. The exhaust turbocharger according to claim 12, wherein the second control member is designed as an overpressure valve or contains such a valve.

14. The exhaust turbocharger according to claim 13, wherein an exhaust cooler is provided in the exhaust return line.

15. The exhaust turbocharger according to claim 5, wherein a check valve is located in the exhaust line connection, said check valve allowing flow in the direction of the boost air line.

16. The exhaust turbocharger according to claim 6, wherein a check valve is located in the exhaust line connection, said check valve allowing flow in the direction of the boost air line.

17. The exhaust turbocharger according to claim 7, wherein a check valve is located in the exhaust line connection, said check valve allowing flow in the direction of the boost air line.

18. The exhaust turbocharger according to claim 8, wherein a check valve is located in the exhaust line connection, said check valve allowing flow in the direction of the boost air line.

19. The exhaust turbocharger according to claim 2, wherein the main compressor, the additional compressor, and the turbine are mounted on a common shaft.

20. The exhaust turbocharger according to claim 4, wherein the main compressor, the additional compressor, and the turbine are mounted on a common shaft.

21. The exhaust turbocharger according to claim 5, wherein the main compressor, the additional compressor, and the turbine are mounted on a common shaft.

22. The exhaust turbocharger according to claim 6, wherein the main compressor, the additional compressor, and the turbine are mounted on a common shaft.

23. The exhaust turbocharger according to claim 9, wherein the main compressor, the additional compressor, and the turbine are mounted on a common shaft.

24. An internal combustion engine assembly comprising:
   an engine,
   an engine exhaust return line,
   an exhaust gas driven turbocharger, and
   a control device operable to switch engine operation between driving and braking operation,
   wherein said turbocharger comprises:
      a main compressor for compressing fresh air to be supplied to the engine,
      an additional compressor for compressing the combustion exhaust gases recycled to engine,
      a turbine that can be driven by the exhaust gases from the engine and which serves to drive the main compressor and the additional compressor,
      an exhaust return line by which the exhaust gases to be returned to the engine are supplied to the additional compressor, and
      a boost air line by which the air compressed in the main compressor is supplied to the engine,
      wherein the turbine has a variable geometry and a first control member is located in the exhaust return line to selectively connect the exhaust return line to the intake side of the additional compressor and to the boost air line, and
      wherein the control device is operable to actuate the turbocharger to regulate engine braking during braking operation.

25. The engine according to claim 24, wherein a further control member connected with the control device is located in an exhaust return line by which the quantity of exhaust flowing into the exhaust return line can be controlled, with the control device being so designed that during braking operation, the control device (a) closes the further control member when the rpm of the engine is in a medium rpm range, (b) opens the further control member increasingly as rpm increases when the rpm of the engine is in a high rpm range, and (c) opens the further control member increasingly with decreasing rpm when the rpm of the engine is in a low rpm range.

26. The engine according to claim 25, wherein the control device is so designed that during braking operation in a low rpm range of engine the control device cuts out an exhaust cooler connected with the control device and located in the exhaust return line.

* * * * *